UNITED STATES PATENT OFFICE.

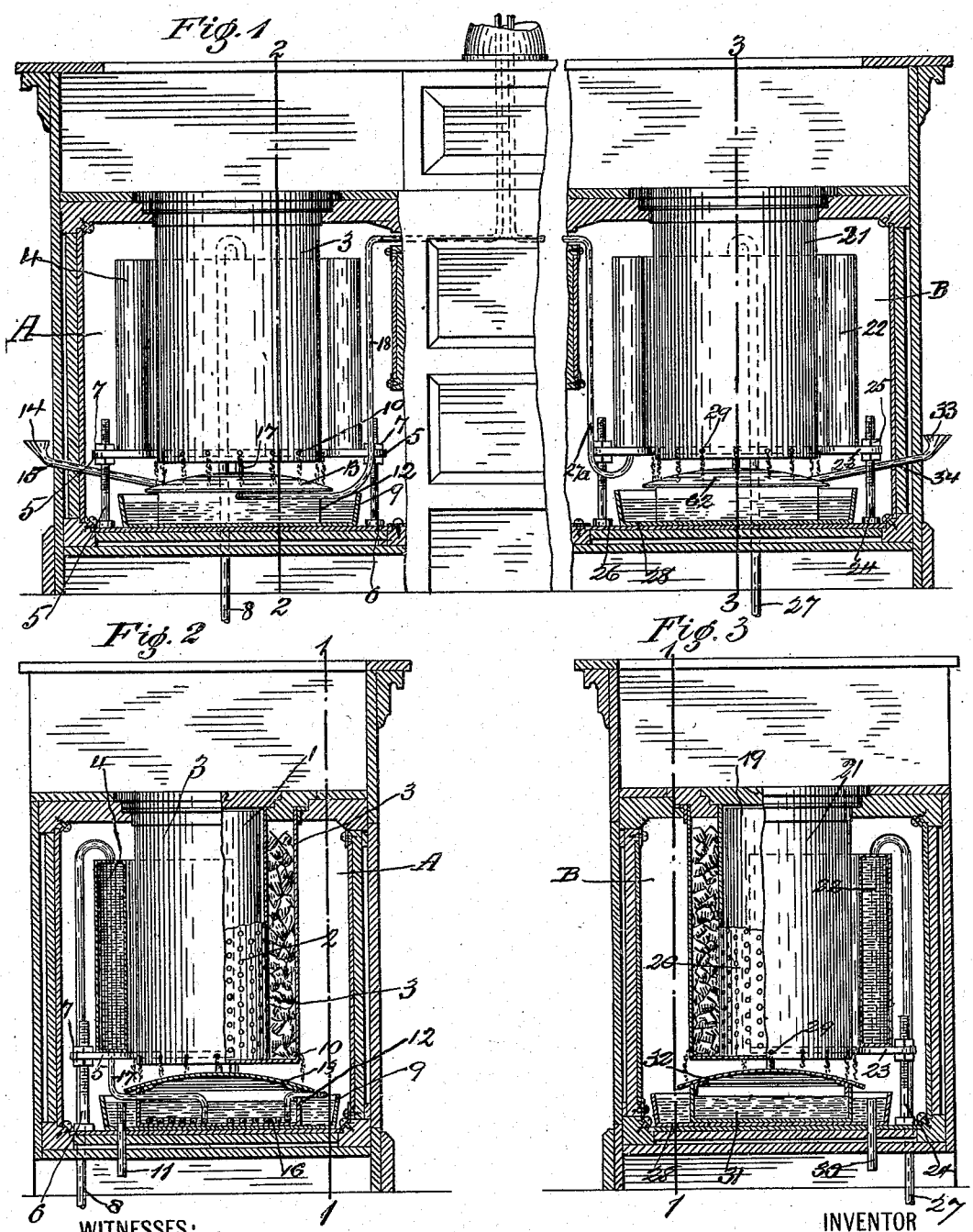

WILLIAM BUTTLER, OF INDIANAPOLIS, INDIANA.

ICE-CREAM-CONTAINING CABINET AND SODA-FOUNTAIN.

No. 930,529.　　　　Specification of Letters Patent.　　　Patented Aug. 10, 1909.

Application filed January 2, 1909. Serial No. 470,306.

*To all whom it may concern:*

Be it known that I, WILLIAM BUTTLER, a citizen of the United States, residing at Indianapolis, in the county of Marion and State of Indiana, have invented certain new and useful Improvements in Ice-Cream-Containing Cabinets and Soda-Fountains, of which the following is a specification, reference being had therein to the accompanying drawing.

My invention relates to improvements in ice cream containing cabinets and soda fountains as hereinafter described in the specification and particularly pointed out in the claims.

The object of this invention is to provide a cabinet in which the cooling means thereof are so arranged that the ice cream contained in the cabinet is utilized to keep the interior refrigerating chambers of the cabinet at the low temperature required in coolers, to maintain the carbonated fluid cool, to provide means to control the temperature of said carbonated fluid, and to produce ice from the drippings of the refrigerant tank situated in the refrigerating chamber of the cabinet. I attain these objects by the arrangement of the cabinet illustrated in the accompanying drawings in which like numerals of reference designate like parts throughout the several views.

Figure 1 is an elevational view of the ice cream cabinet showing the end portions thereof in section and taken along the line 1—1 in Figs. 2 and 3; Fig. 2 is a transverse sectional view taken along the line 2—2 in Fig. 1; and, Fig. 3 is a similar transverse sectional view taken along the line 3—3 in Fig. 1.

The right and left hand end compartments of the cabinet are alike and the arrangement of the cooling means situated in said end compartments of the cabinet are similar in construction and arrangement as will appear in the following description.

The compartments A and B in which the cooling apparatus is contained are preferably situated at the ends of the cabinet.

I will first describe the refrigerating and cooling apparatus in the left-hand compartment A, see Figs. 1 and 2.

The ice cream receptacle 1 is adapted to loosely fit in the perforated separating vessel 2 which vessel is situated within the refrigerant containing tank 3, and said perforated vessel is provided for the purpose of preventing the freezing mixture contained in said refrigerant tank from contacting directly with the ice cream receptacle, so that the latter receptacle may readily be removed and be replaced by another when such is desired. The space between the perforated separating vessel 2 and the wall of the refrigerant containing tank 3 is filled with a refrigerant which is usually composed of rock salt and broken ice, and said refrigerant maintains the ice cream contained in the ice cream receptacle 1 at a low temperature.

A water tank 4, for containing carbonated water, of a semi-circular form, is situated to surround a portion of the refrigerant containing tank 3, and the said tank is provided with the feet 5 to which are secured the adjustable standards 6 which standards are threaded at their top portions to receive the adjusting nuts 7, so that the height of the said tank 4 may be varied. The lower feet of said standards rest upon the floor of the compartment A, so that the said standards and the tank 4 supported by them, may be moved nearer to or farther from the surface of the refrigerant containing tank 3 so that by this adjustment the temperature of the fluid contained in the tank 4 may be regulated and controlled. If the fluid contained in the tank is not sufficiently cold said tank may be brought closer to the refrigerant containing tank 3 and if too cold said tank may be readily moved farther from the refrigerant containing tank 3. A pipe extends from a tank charged with carbonated water situated in any convenient place and is connected with the top of the tank 4. An open topped drip-pan 9 is situated under the refrigerant containing tank 3 and is provided for the purpose of catching the refrigerant fluid that drips from said refrigerant containing tank 3 through the lower openings 10 thereof. The drip-pan 9 is provided with an over-flow pipe 11 for the purpose of maintaining the level of the refrigerant fluid in the drip-pan constant. A plain-water containing pan 12 is situated in said drip-pan 9 directly under the refrigerant containing vessel 3, and the said pan is provided with a removable concaved lid or cover 13 which is provided for the purpose of conducting the drippings as they drop from the refrigerant containing tank 3 into the drip-pan 9 and preventing the refrigerant fluid from getting into the plain-water containing pan 12. The pipes 8, 17 and 18 are each provided with a suitable hinge or knuckle joint situated so that the tank 4 may be readily raised or lowered without disturbing said pipes. A funnel 14 is provided with a pipe 15 which connects with the interior of the plain-water containing pan 12, and said funnel is provided for the purpose of supplying plain-water to the pan 12 without necessitating the opening of the door of the compartment and the removal of the lid 13 in order to supply plain-water to the pan 12. A flat coil of pipe 16 rests on the inner side of the bottom of the pan 12 and a pipe 17 connects said coil to the lower bottom portion of the tank 4 which contains carbonated water, and a pipe 18 is connected to said pipe 17 and extends therefrom to a dispensing faucet situated in a convenient position on the cabinet.

I will now proceed to describe the cooling and refrigerating apparatus contained on the right hand compartment B of the cabinet which apparatus is similar in construction to that contained in the left-hand compartment A of the cabinet. The ice cream receptacle 19 is adapted to loosely fit in the perforated vessel 20 which latter vessel is situated within the refrigerant containing tank 21. The space between the perforated vessel 20 and the wall of the refrigerant containing tank 21 is filled with a refrigerant as hereinbefore described.

The water containing tank 22 is similar to the tank 4 in construction and form and in like manner is so situated as to surround a portion of the refrigerant containing tank 21, and the said tank is provided with the feet 23 to which are secured the adjustable standards 24 which standards are threaded at their top portions to receive the adjustable nuts 25 so that the height of the said tank 22 may be varied. The lower feet 26 of said standards rest upon the floor of the compartment B so that said standards and the tank 22 supported by them, may be moved nearer to or farther from the surface of the refrigerant containing tank 21, so that by this adjustment the temperature of the fluid contained in the tank 22 may be regulated and controlled. If the fluid contained in the tank 22 is not sufficiently cold the said tank may be brought closer to the refrigerant containing tank 21, and if too cold, said tank may be readily moved from the refrigerant containing tank 22. A pipe 27 is connected to and extends from a source of water supply and is connected with the top of the tank 22. A pipe 27$^a$ is connected at one end to the bottom of the tank 22 and extends therefrom to a dispensing faucet situated in a convenient position on the cabinet. An open topped drip-pan 28 is situated under the refrigerant containing tank 21 and the same is provided for the purpose of catching the refrigerant fluid that may drip from said refrigerant containing tank 21 through the lower openings 29 thereof. The drip-pan 28 is provided with an over-flow pipe 30 which is provided for the purpose of maintaining the level of the refrigerant fluid in said drip-pan 28 constant. A plain-water containing pan 31 is situated in said drip-pan 28 directly under the refrigerant containing tank 21 and the said pan is provided with a removable concaved lid 32 which lid is provided for the purpose of conducting the refrigerant fluid drippings as they drop from the refrigerant containing tank 21 into the drip-pan 28, thus preventing the refrigerant fluid from getting into the plain-water containing pan 31. The pipes 27 and 27$^a$, are each provided with a suitable hinge or knuckle joint situated so that the tank 22 may be readily raised or lowered without disturbing said pipes. A funnel 33 is provided with a pipe 34 which latter connects said funnel and said plain-water containing pan 31, said funnel is provided for the purpose of supplying plain-water to the pan 31 without necessitating the opening of the door of the compartment in which the pan is situated or the removal of the lid 32 in order to supply sweet water to the pan 31. The water contained in this pan is rapidly frozen into ice by reason of the pan being immersed in the refrigerant fluid, and said ice may be used by the dispenser when needed.

I claim:

1. In a soda fountain and cabinet, the combination with a refrigerant containing tank, an ice cream receptacle situated in said refrigerant containing tank, a tank having one of its sides contiguous to said refrigerant containing tank, and adjustable means for supporting said tank in vertical position, of a refrigerating plain-water containing pan situated under said refrigerant containing tank, a removable roof or cover on said pan, a pipe coil immersed in the water contained in said refrigerating pan said pipe coil connected to said tank, and a draft pipe extending from said tank to a dispensing faucet.

2. In a soda fountain and cabinet, the combination with a refrigerant containing tank, an ice cream receptacle situated in said refrigerant containing tank, a convexo-concave tank situated with its concave side toward said refrigerant containing tank, and supporting legs adjustably secured to said tank whereby the height of the latter may be increased or diminished, of a refrigerating plain-water containing pan situated under said refrigerant containing tank, a removable roof or cover on said pan, a pipe coil situated and immersed in the water contained in said refrigerating pan, said pipe coil connected to said tank, and a draft pipe extending from said coil to be connected to a dispensing faucet.

3. In a soda fountain and cabinet, the combination with a refrigerant containing tank, an ice cream receptacle situated in said refrigerant containing tank, a convexo-concave formed tank having its concave side toward said refrigerant containing tank, and supporting legs adjustably secured to said tank whereby the height of the tank may be varied, of an open topped drip-pan situated under said refrigerant containing tank, an over-flow pipe extending from said drip-pan, of a refrigerating plain-water containing pan situated in said drip-pan and under said refrigerant containing tank, a removable cover or roof on said refrigerating pan, a pipe coil immersed in the plain-water contained in said refrigerating pan said coil connected to said tank, and a draft pipe extending from said tank to be connected to a dispensing faucet.

4. In a soda fountain and cabinet, the combination with a refrigerant containing tank, an ice cream receptacle situated in said refrigerant containing tank, a convexo-concave tank having its concave side toward said refrigerant containing tank, a pipe extending from a source of plain-water supply and connected to the top end of said tank, a draft pipe extending from the bottom of said tank to be connected to a dispensing faucet, and supporting legs adjustably secured to said tank whereby the height of said tank may be varied, of a refrigerating plain-water containing pan situated in said drip-pan under said refrigerant containing tank, a removable cover or lid on said refrigerating pan and a spout for supplying plain-water thereto.

In testimony whereof I affix my signature in presence of two witnesses.

WILLIAM BUTTLER.

Witnesses:
 THOMPSON R. BELL,
 FRANCIS M. SPRINGER.